(12) United States Patent
Watts

(10) Patent No.: US 6,302,171 B1
(45) Date of Patent: Oct. 16, 2001

(54) SELF-TRIGGERING INFLATABLE BALLOON DEVICE AND VALVE THEREFOR HAVING AN IMPROVED PUNCTURE STAKE

(75) Inventor: Bruce D. Watts, Greens Fork, IN (US)

(73) Assignee: Connie Watts, Greens Fork, IN (US)

( * ) Notice: Subject to any disclaimer, the term of this patent is extended or adjusted under 35 U.S.C. 154(b) by 0 days.

(21) Appl. No.: 09/708,989

(22) Filed: Nov. 8, 2000

(51) Int. Cl.[7] ............... B65B 1/04; B65B 3/04; B67C 3/00
(52) U.S. Cl. ............ 141/317; 141/313; 141/329; 116/DIG. 9; 446/220
(58) Field of Search ............. 141/67, 114, 197, 141/313, 314, 346, 348, 317, 329; 446/220–226; 116/210, DIG. 8, DIG. 9; 137/223

(56) References Cited

U.S. PATENT DOCUMENTS

| | | |
|---|---|---|
| 2,574,028 | 11/1951 | Fields et al. . |
| 4,433,638 | 2/1984 | Ashline . |
| 4,787,575 | 11/1988 | Stewart . |
| 4,800,835 | 1/1989 | Mears . |
| 4,903,958 | 2/1990 | DiCarlo et al. . |
| 5,083,771 | 1/1992 | Tyner . |
| 5,095,845 | 3/1992 | Murphy . |
| 5,234,726 | 8/1993 | Dahan . |
| 5,399,122 | 3/1995 | Slater . |
| 5,579,813 | 12/1996 | Watts . |
| 5,935,013 | 8/1999 | McLennan . |

*Primary Examiner*—Timothy L. Maust
(74) *Attorney, Agent, or Firm*—Woodard, Emhardt, Naughton, Moriarty & McNett

(57) ABSTRACT

A self-triggering inflatable balloon device. In a preferred embodiment, the device comprises a cylinder of compressed gas having an actuating valve thereon. The other end of the actuating valve is coupled to a deflated balloon. The cylinder, valve and deflated balloon are secured to the interior of a box having a lid. An actuating member of the valve is coupled to the box lid such that the valve is opened when the box lid is raised. Upon opening of the box lid, therefore, the actuating valve is opened and the balloon is automatically inflated with the gas from the compressed gas cylinder. The device may be given as a gift wrapped present or mailed to a friend, and will produce a surprise when opened.

8 Claims, 7 Drawing Sheets

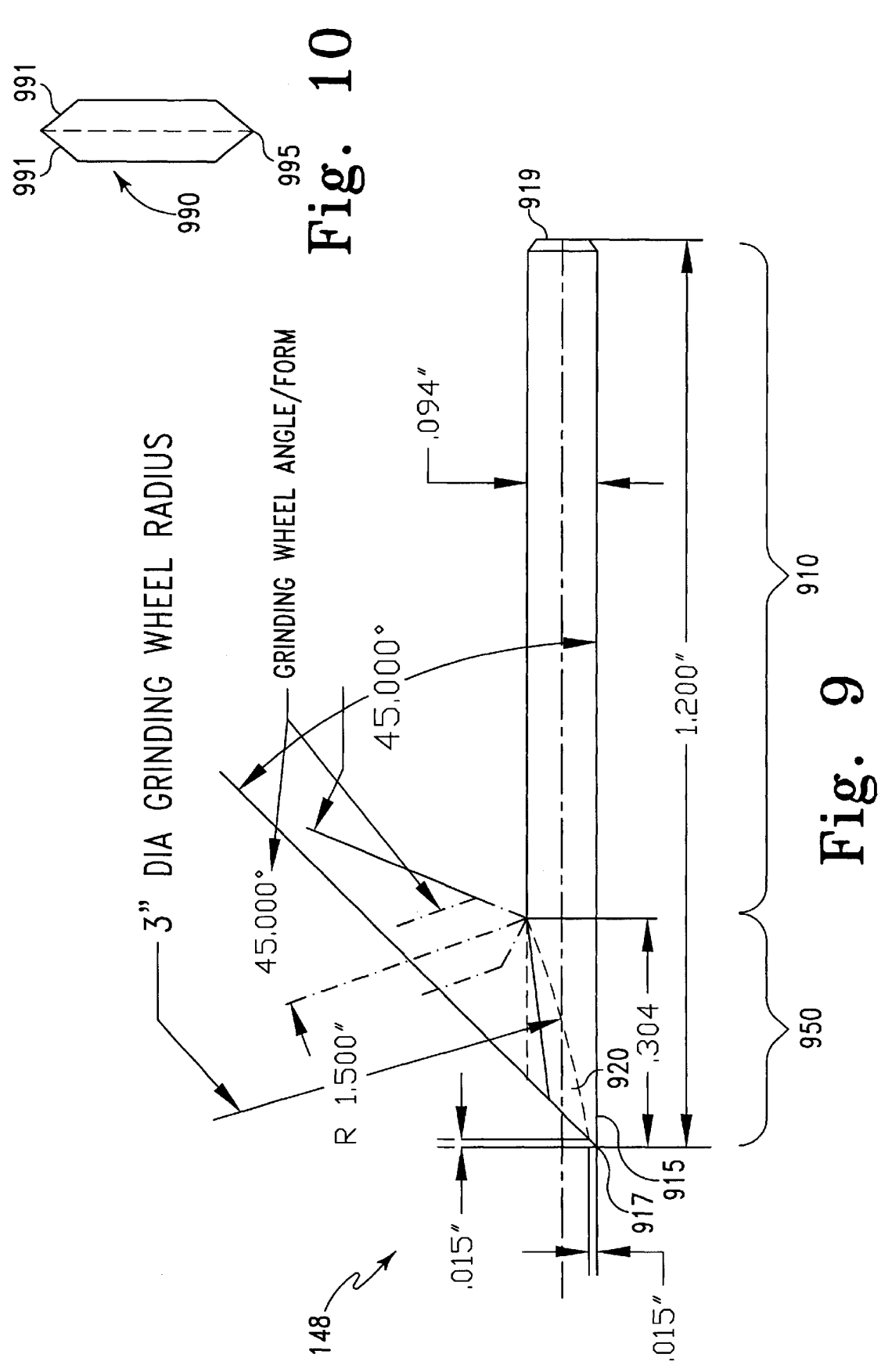

SELF-TRIGGERING INFLATABLE BALLOON DEVICE AND VALVE THEREFOR HAVING AN IMPROVED PUNCTURE STAKE

TECHNICAL FIELD OF THE INVENTION

The present invention generally relates to inflatable balloons, and more particularly to a self-triggering inflatable balloon device having an improved puncture stake.

BACKGROUND OF THE INVENTION

Balloons are commonly used as festive decorations to signify the celebration of some important event or anniversary. Balloons are universally recognized as a sign of happiness and celebration. It is therefore commonplace to purchase one or more balloons to give as a gift when celebrating a significant occasion.

Helium-filled balloons and other balloons inflated with gases that make them buoyant under normal atmospheric conditions are by far the most popular type of balloon. Such balloons are by perceived necessity sold to consumers already inflated with the buoyant gas because most consumers to do not possess means to inflate them. These inflated balloons have a limited life span, owing to the tendency of the balloons to deflate over time as the buoyant gas leaks from the interior of the balloon to the exterior, either through the inflation orifice or through the balloon material itself. Also, inflated balloons are very bulky and fragile, exhibiting explosive decompression if damaged in any way.

Because of the limited life span and the bulky and fragile nature of inflated balloons, it is not practical to send them through the mail. The cost of mailing is prohibitive due to the size of the balloon, and the odds of the balloon arriving at its destination inflated are small, it being likely that the balloon will deflate during transit due to leakage or damage. For the same reasons, it is generally not practical to gift wrap balloons and give them as presents.

Because of these limitations in past balloon technology, it was generally impractical or infeasible to send an inflated balloon to someone through the mail or to give balloons as gift-wrapped presents due to their bulky nature and due to the delay between sending or wrapping and receipt.

In response to this problem, I invented the self-triggering inflatable balloon device described in U.S. Pat. No. 5,579,813, the disclosure of which is hereby incorporated herein in its entirety. In practice, I found that the operation of a valve by movement of a handle created an undesirably high resistance to the opening of a lid. In response to this problem, I had a valve designed for use in a self-triggering inflatable balloon device as described in U.S. Pat. No. 5,935,013, the disclosure of which is also hereby incorporated in it's entirety. Further experience has shown that it is desirable to control the rate of inflation of the balloon when the stake 148 passes through the internal passageway 138 and into the internal aperture 134, thereby puncturing the membrane on the end of the cylinder 120. If the rate of inflation is too great, it may cause the balloon to burst, or to separate from the valve. On the other hand, if the rate is too slow, much of the surprise from the automatic inflation is lost. There is, therefore, a need for a stake that can puncture a membrane in such a way as to release gas at a controlled rate, in order to optimize the visual impact of an automatically inflating balloon. The present invention is directed toward meeting this need.

SUMMARY OF THE INVENTION

The present invention relates to a puncture stake for a self-triggering inflatable balloon device. In a preferred embodiment, the device comprises a cylinder of compressed gas having an actuating valve thereon. The other end of the actuating valve is coupled to a deflated balloon. The cylinder, valve, and deflated balloon are secured to the interior of a box having a lid. An actuating member of the valve is coupled to the box lid such that the valve is opened when the box lid is raised. Upon opening of the box lid, therefore, the actuating valve is opened and the balloon is automatically inflated with the gas from the compressed gas cylinder. The device may be given as a gift wrapped present or mailed to a friend, and will produce a surprise when opened.

In one form of the invention, a stake for puncturing a membrane in a valve to permit the controlled release of a gas is disclosed, comprising a head portion adapted to strike the membrane and cut a hole into the membrane; a shaft portion disposed adjacent the head portion; a flute formed into the head portion and adapted to prevent the stake from sealing said hole.

In another form of the invention, a stake for puncturing a membrane in a valve to permit the controlled release of a gas is disclosed, comprising a head portion adapted to strike the membrane and cut a hole into the membrane; a shaft portion disposed adjacent the head portion; a flute formed into the head portion and adapted to prevent the stake from sealing said hole; said flute having bilateral symmetry about a plane including an axis of radial symmetry of said shaft portion; said flute being formed by grinding said flute into a pin with a grinding wheel; said pin having a diameter of about 0.094 inches, a length of about 1.2 inches, and a head-end defining about a 45-degree angle with an axis of said pin; and wherein said grinding wheel has a diameter of about 3 inches in diameter and has two grinding faces each defining about a 45-degree angle with a plane defined by a circumference of said grinding wheel; and wherein said head portion cuts said hole by cutting a "C"-shaped flap which is subsequently bent in a direction of motion of the stake by said head portion to open said hole.

In another form of the invention, a valve for a self-triggering inflatable balloon device is disclosed, comprising a valve casing having an exterior, an interior, and an aperture for coupling a compressed gas container thereto and a nipple for coupling a balloon thereto; a spike contained within the valve casing, the spike comprising a head portion adapted to strike the membrane and cut a bole into the membrane; a shaft portion disposed adjacent the head portion; a flute formed into the head position and adapted to prevent the stake from sealing said hole, the flute being formed by grinding with a grinding wheel; and biasing means disposed between the spike and an interior surface of the valve casing, wherein the biasing means urges the spike toward the aperture; and a trigger extending from the exterior to the interior of the valve casing, wherein the trigger limits movement of the spike toward the aperture; wherein removal of the trigger from the valve casing enables the biasing means to propel the spike into the aperture, thereby allowing compressed gas within the container to escape into an interior of the balloon, thereby inflating the balloon; and wherein the cylindrical slug further comprises an annular recess therearound for mounting the biasing means to the cylindrical slug.

In yet another form of the invention, a valve for a self-triggering inflatable balloon device is disclosed, comprising a valve casing having an exterior, an interior, and an aperture for coupling a compressed gas container thereto and a nipple for coupling a balloon thereto; a spike contained within the valve casing, the spike comprising a head portion adapted to strike the membrane and cut a hole into the membrane; a shaft portion disposed adjacent the head position; a flute formed into the head portion and adapted to prevent the stake from sealing said hole; said flute being formed by grinding into a pin; said pin having a length of about 1.2 inches, a diameter of about 0.094 inches, and a head-end defining about a 45-degree angle with an axis of said pin; said grinding wheel having a diameter of about 3 inches and having two grinding surfaces each defining about a 45-degree angle with a plane defined by a circumference of the grinding wheel, said flute having bilateral symmetry about a plane including an axis of radial symmetry of said shaft portion; and biasing means disposed between the spike and an interior surface of the valve casing, wherein the biasing means urges the spike toward the aperture; and a trigger extending from the exterior to the interior of the valve casing, wherein the trigger limits movement of the spike toward the aperture; wherein removal of the trigger from the valve casing enables the biasing means to propel the spike into the aperture, thereby allowing compressed gas within the container to escape into an interior of the balloon, thereby inflating the balloon; and wherein the cylindrical slug further comprises an annular recess therearound for mounting the biasing means to the cylindrical slug.

BRIEF DESCRIPTION OF THE DRAWINGS

FIG. 9 is a side elevational view of a preferred embodiment stake according to the present invention.

FIG. 10 is an end elevational view of a preferred embodiment grinding wheel used to fabricate the stake of FIG. 9.

DESCRIPTION OF THE PREFERRED EMBODIMENT

Figure 1:
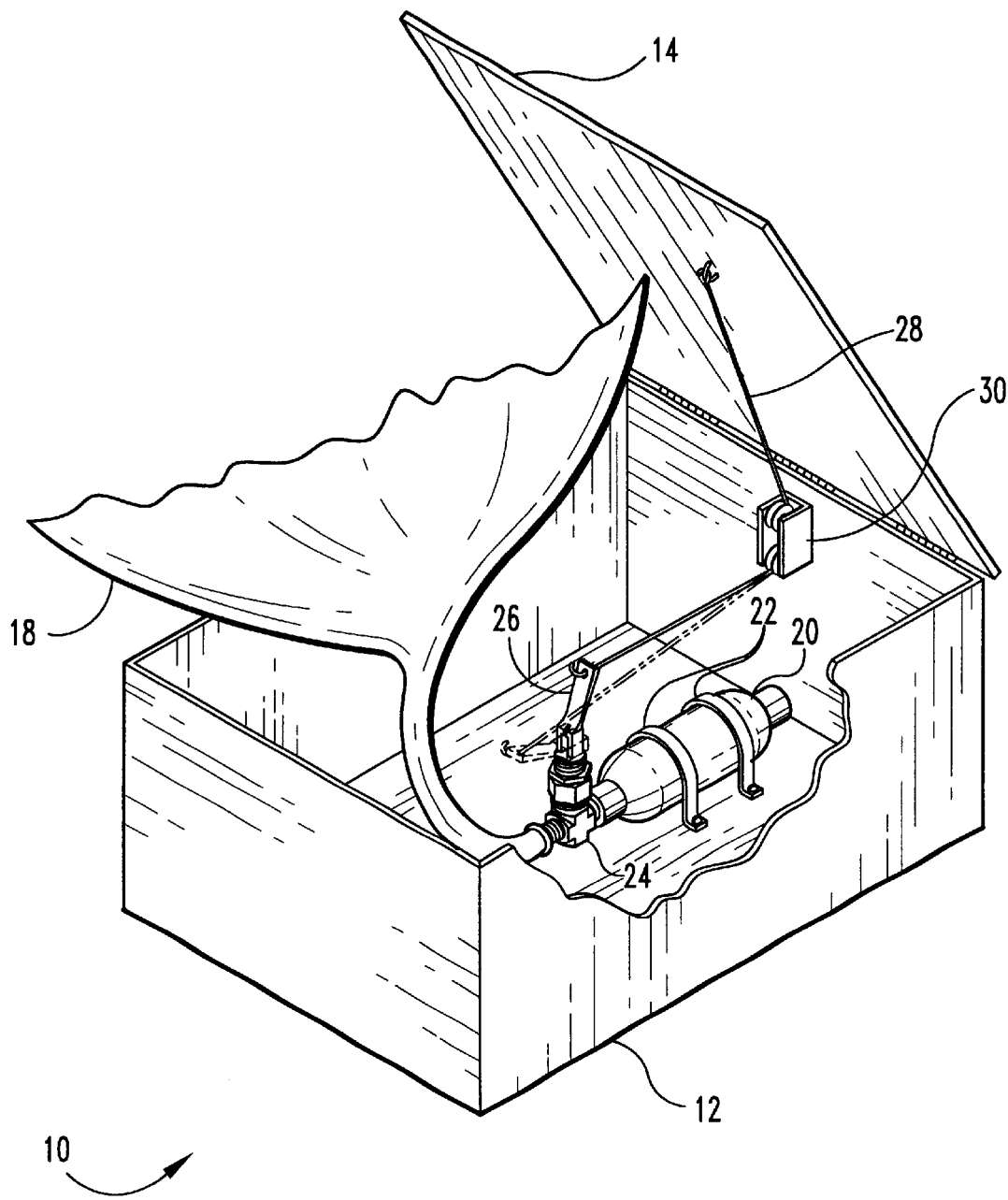
FIG. 1 is a perspective view of a prior art self-triggering inflatable balloon device.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
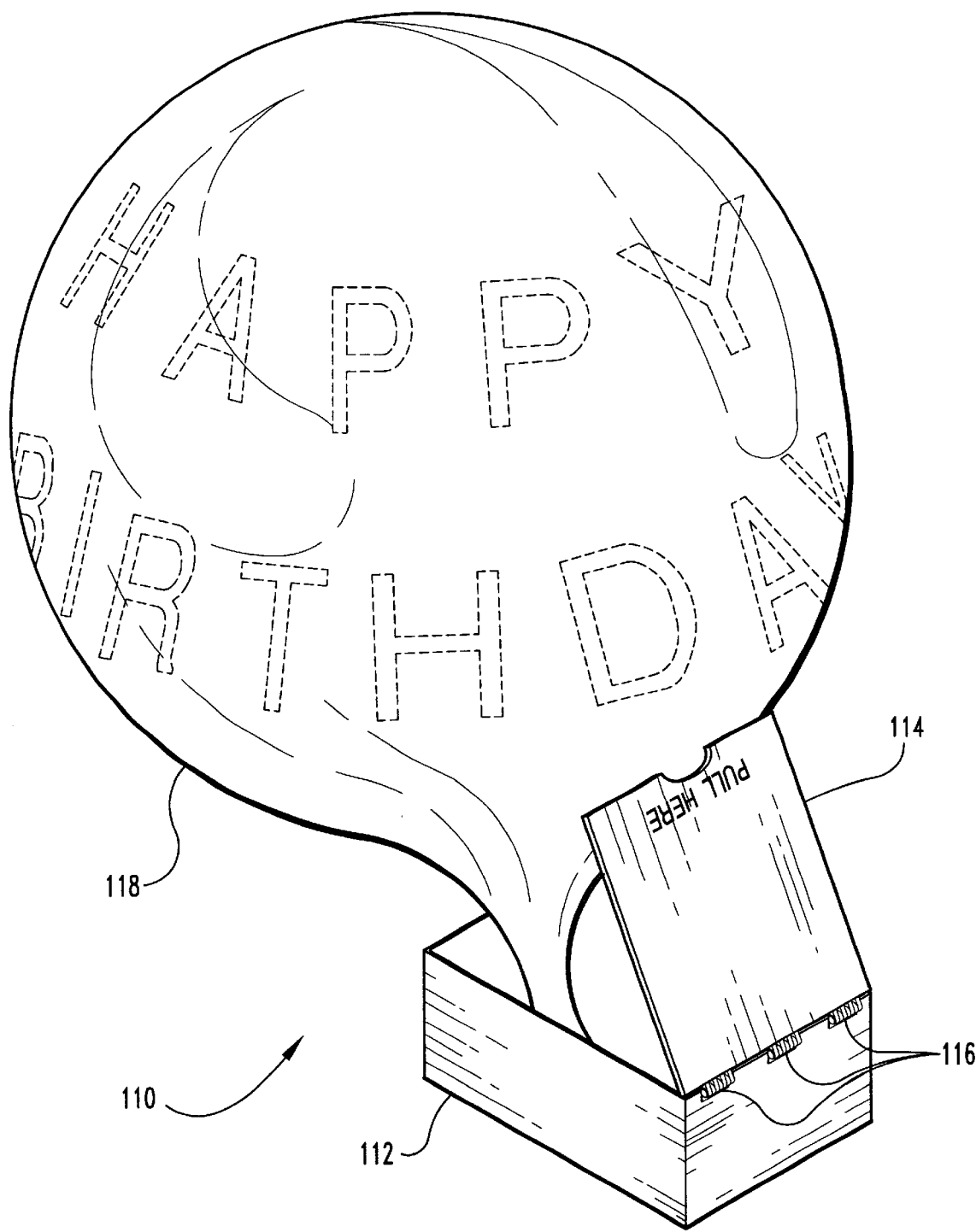
FIG. 2 is a perspective view of the present invention, showing the balloon inflated.

Referring now to FIG. 2, there is illustrated a preferred embodiment of the self-triggering inflatable balloon device of the present invention, indicated generally at 110. The present invention is completely enclosed in a suitable enclosure, such as a box 112, which may be made of any suitable material, such as cardboard or wood. The box 112 includes an openable portion, such as a lid 114, which is hingedly attached to the box 112 at one end by means of any suitable connection, such as a crease in the cardboard or by means of discreet hinges 116. The lid 114 may optionally include opening instructions thereon, such as the message "PULL HERE." With the lid 114 closed upon the box 112, the present invention may be gift wrapped or mailed to remote locations. When the recipient of the box 112 opens the lid 114, a balloon 118 is caused to be automatically inflated from within the box 112, by means which will be described in greater detail hereinbelow.

It will be appreciated by those skilled in the art that by means of the present invention, a deflated balloon 118 may be enclosed within the box 112 for an indefinite period of time and also mailed to a remote location without substantial risk of damage to the balloon 118. Because the balloon 118 is only inflated upon the lifting of the lid 114, there is not concern that the gas within the balloon 118 will leak therefrom prior to receipt of the balloon 118 by its intended recipient. Furthermore, because the balloon 118 is packaged in a deflated state, the box 112 does not have to be large enough to contain the large and bulky size of the inflated balloon. For this reason, the self-triggering inflatable balloon device 110 of the present invention may be easily stored, wrapped, mailed or transported. It will be further appreciated by those skilled in the art that any suitable message, picture or design may be imprinted onto the balloon 118 in order to convey a message to the recipient. For example, the balloon 18 illustrated in FIG. 1 is imprinted with the words "HAPPY BIRTHDAY" such that a birthday greeting is automatically presented to the recipient upon lifting the lid 114.

Figure 3:
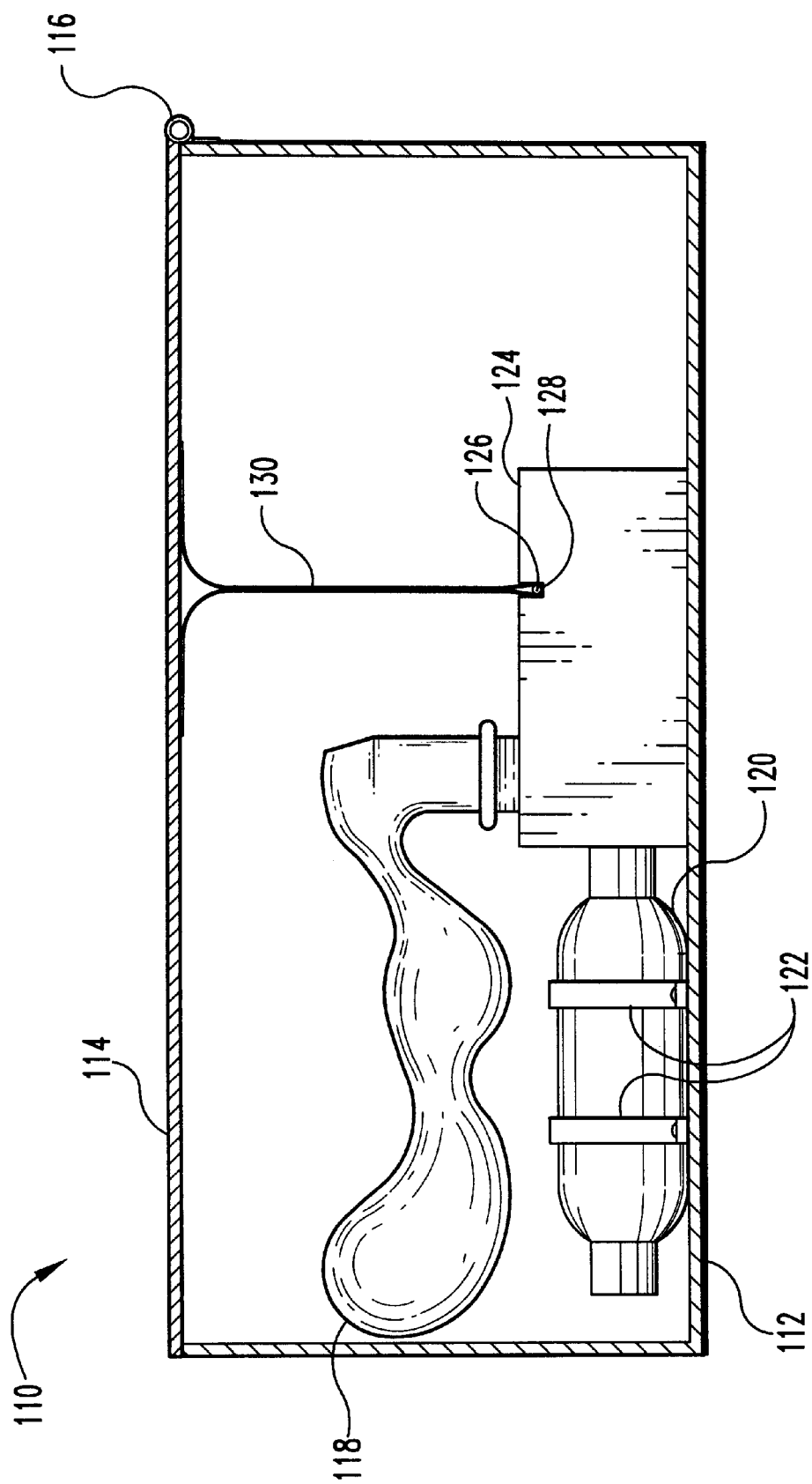
FIG. 3 is a cross-sectional view showing an interior of the box with the balloon deflated.

Referring now to FIG. 3, the self-triggering inflatable balloon device of the present invention is illustrated in cross-section. In the view of FIG. 3, the box 112 is shown with the lid 114 closed, and with the balloon 118 in a deflated state.

The device 110 includes a container 120 filled with a compressed gas. A preferred embodiment of the present invention, the container 120 is a metal cylinder filled with carbon dioxide gas. However, the present invention comprehends the use of any suitable gas, such as helium or nitrogen. The cylinder 120 is prevented from moving within the box 112 by securing it to the interior thereof by any suitable means, such as by means of U-clips 122.

Gas is prevented from escaping the cylinder 120 by means of a valve 124 connected to an end thereof. A second end of the valve 124 is coupled to an opening in the balloon 118. The present invention comprehends the use of any suitable balloon 118, such as a latex or Mylar balloon. The valve 124 includes an actuating trigger rod 126 which is operative to cause the valve 124 to puncture the cylinder 120 when the rod 126 is removed from the slot 128 formed within the valve 124, as discussed in greater detail hereinbelow. Puncturing the cylinder 120 causes the compressed gas held therein to escape from the cylinder 120, through the valve 124, and into the interior of the balloon 118, thereby causing the balloon 118 to inflate. The amount of gas within the cylinder 120 is chosen such that the balloon 118 will become substantially fully inflated upon the puncturing of the cylinder 120.

The actuating rod 126 is coupled to the interior side of the lid 114 by any convenient means, such as a loop of tape 130. The length of the tape 130 extending from the surface of the lid 114 is chosen such that opening the lid 114 causes tension to be placed upon the tape 130, thereby pulling the actuating rod 126 from the slot 128 and activating the valve 124. Therefore, when the lid 114 is raised, the balloon 118 automatically inflates by means of the pressurized gas escaping from within the cylinder 120, through the valve 124, and into the interior of the balloon 118. Once the balloon inflation process has begun, it cannot be stopped or reversed by attempting to close the lid 114.

Figure 4:
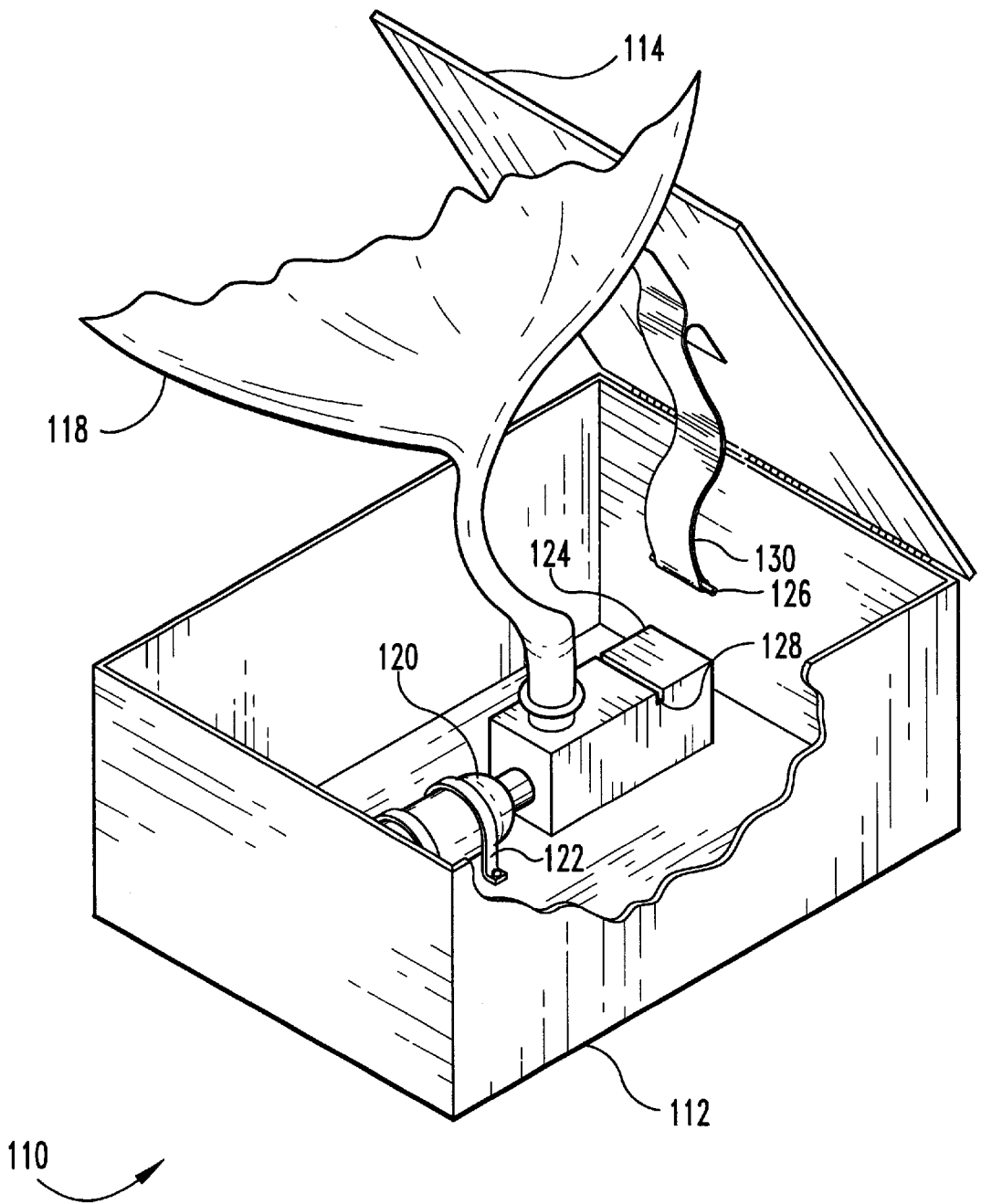
FIG. 4 is a second perspective view showing the interior of the box.

It will be appreciated by those skilled in the art that the self-triggering inflatable balloon device of the present invention allows the balloon 118 to be maintained in a deflated condition until the balloon is received by the intended recipient, thereby allowing the device 110 to be stored for indefinite periods of time after purchase without the danger of the inflation gas leaking therefrom. This will allow the device 110 to be purchased well in advance of the occasion for which it was purchased, and will also allow the device 110 to be gift wrapped and presented to the recipient in advance of the time designated for opening the device. Furthermore, because the balloon 118 remains in a compact, uninflated state within the device 110, the device 110 can readily be transported or mailed to a remote location. The device 110 is illustrated in FIG. 4 in its inflated position, wherein it can be seen that the actuating rod 126 has been pulled from the slot 128 in the valve 124, and now hangs from the lid 114 by means of the tape 130.

Figure 5A:
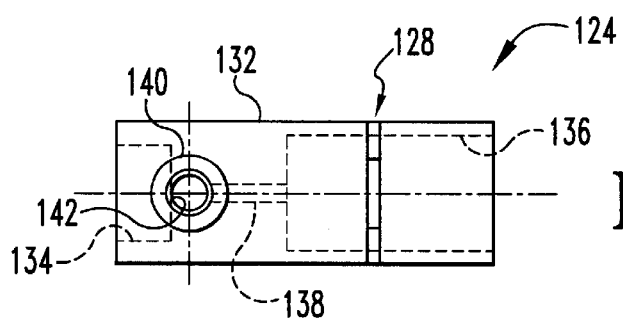
FIGS. 5A–C are, respectively, top plan, side elevational and end views of a preferred embodiment valve of the present invention.
Figure 5B:
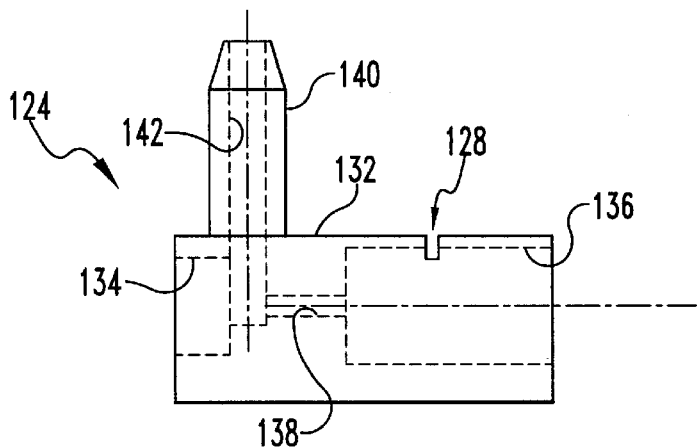
Figure 5C:
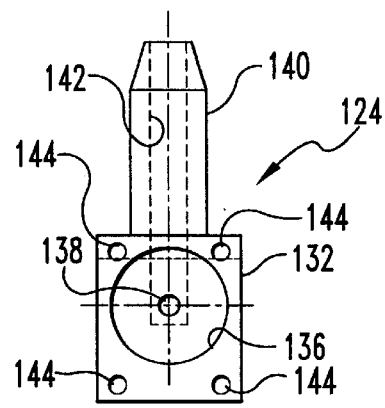
Figure 6:
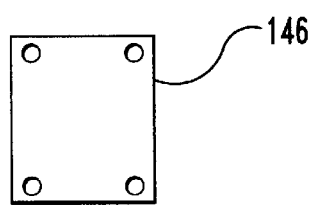
FIG. 6 is a top plan view of an end cover for the valve of FIGS. 5A–C.

Referring now to FIGS. 5A–C, the external casing for the valve 124 is illustrated. The casing for the valve 124 is preferably formed from injection molded plastic, however those having ordinary skill in the art will recognize that the valve 124 may be formed from any desired material, including machined aluminum. The valve 124 includes a main body portion 132 into which the slot 128 is cut. A threaded aperture 134 is formed into one end of the casing 132. The threaded aperture 134 is sized so as to allow the compressed gas cylinder 120 to be threadedly coupled thereto. A second, non-threaded aperture 136 is formed into the opposite end of the casing 132. A passageway 138 is formed in the casing 132 so as to couple the apertures 134 and 136. A nipple 140 is formed onto a top surface of the casing 132, the nipple 140 providing convenient means for mounting the balloon 118 to the valve 124. An internal passageway 142 is formed within the nipple 140 and intersects the aperture 134 and the passageway 138. Four threaded holes 144 are formed into the end of the casing 132 around the opening of the aperture 136. These threaded holes 144 allow the mounting of a cover 146 (see FIG. 6) to the valve 124 by means of four screws (not shown).

Figure 7:
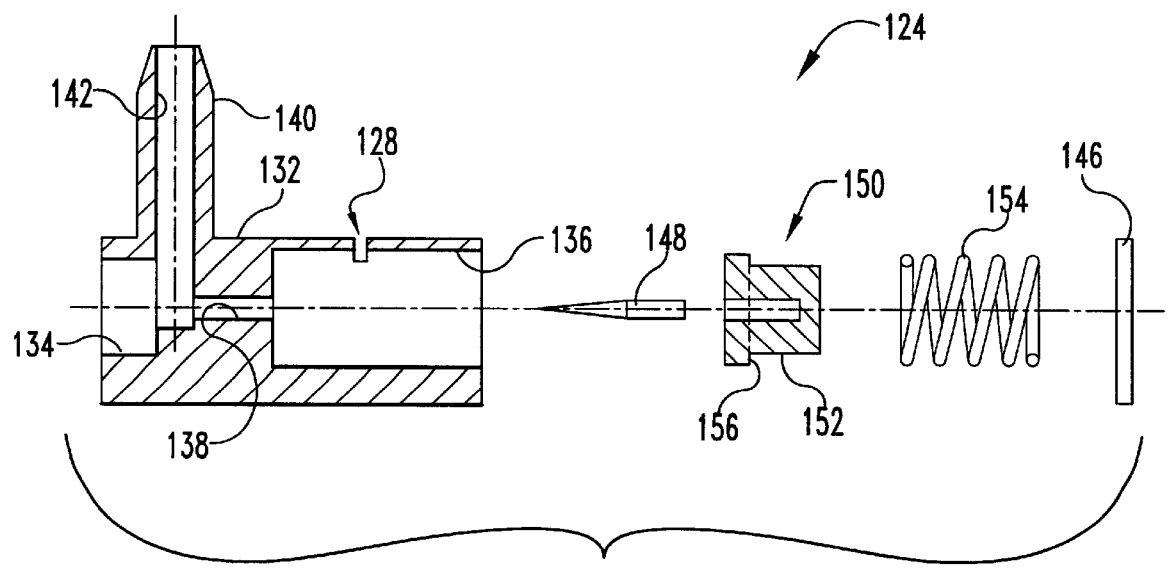
FIG. 7 is a partial cross-sectional, exploded view of the valve according to the present invention.

Assembly of the remaining components of the valve 124 into the casing 132 is illustrated in an exploded partially cross-sectional view in FIG. 7. Puncturing of the membrane sealing the compressed gas cylinder 120 is accomplished by means of a metal spike 148 mounted into a cylindrical slug 150. The slug 150 is preferably formed from injection molded plastic. The slug 150 includes an annular recess 152 around one end thereof in order to facilitate mounting a spring 154 around the slug 150. The annular recess forms a ridge 156 around the circumference of the slug 150, thereby preventing the spring 154 from moving past this ridge 156. The cylindrical slug 150 is formed such that its maximum diameter is just slightly smaller than the internal diameter of the aperture 136. Furthermore, the maximum diameter of the spike 148 is formed to be slightly smaller than the internal diameter of the passageway 138.

Figure 8:
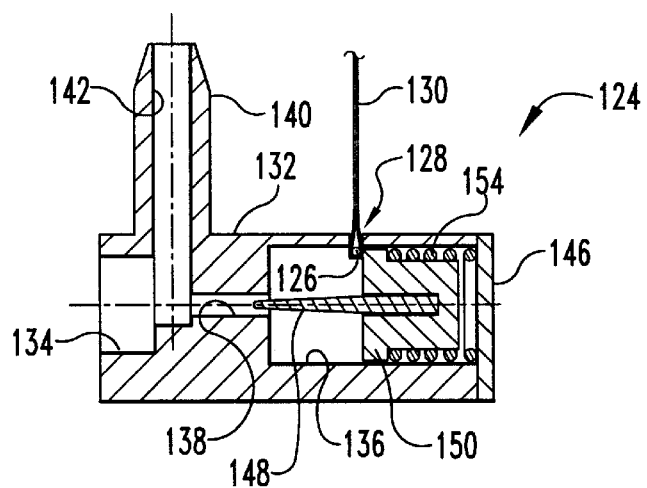
FIG. 8 is a cross-sectional view of the valve according to the present invention prior to being triggered.

The valve 124 is shown in its assembled and cocked position in FIG. 8. It can be seen that the presence of the actuating trigger rod 126 within the slot 128 prevents the cylindrical slug 150 from moving to the left of the slot 128. This causes the spring 154 to be compressed between the circumferential ridge 156 of the slug 150 and the end plate 146 coupled to the casing 132. With the valve 124 in this cocked position, the cylinder 120 is screwed into the aperture 134 such that the membrane on the end of the cylinder 120 faces the passageway 138. The cylinder 120/valve 124 is then mounted to the interior of the box 112 as shown in FIG. 3. The balloon 118 is placed onto the nipple 140, and the tape 130 is attached to the underside of the lid 114.

Thereafter, once the lid 114 is raised, tension on the tape 130 causes the actuating trigger rod 126 to be pulled from the slot 128. Removal of the actuating rod 126 frees the only obstacle to movement of the cylindrical slug 150 within the internal aperture 136. Therefore, the force exerted against the slug 150 by the compressed spring 154 acts to drive the slug rapidly to the left, whereby the stake 148 passes through the internal passageway 138 and into the internal aperture 134, thereby puncturing the membrane on the end of the cylinder 120. Puncturing the membrane on the end of the cylinder 120 allows the compressed gas therein to escape, this compressed gas moving through the internal passage 142 and into the interior of the balloon 118, thereby causing the balloon 118 to inflate. Pressure of the slug 150 against the interface between the internal aperture 136 and the internal passageway 138, as well as the substantial filling of the passageway 138 by the stake 148, substantially eliminates any flow of compressed gas through the passageway 138. Therefore, all of the compressed gas within the cylinder 120 will be routed to the interior of the balloon 118 through the passageway 142. The diameter of the passageway 142 is chosen so as to achieve the desired rate of inflation of the balloon 118.

It will be appreciated by those skilled in the art that various features of the preferred embodiment as disclosed herein may be modified. For example, it is possible to require that the lid 114 of the box 112 be slid open, thereby also pulling the actuating rod 126 from the slot 128. Furthermore, it is not necessary that the balloon 118 be attached directly to the valve 124. For example, a length of tubing may be coupled between the balloon 118 and the valve 124 in order to allow the balloon 118 to rise farther out of the box 112 once the lid 114 has been raised.

Referring now to FIG. 9, a preferred embodiment stake 148 is shown. The stake 148 is preferably about 1.2 inches in length (although those having ordinary skill in the art will recognize that stake 148 may be any convenient length), and has a cylindrical shaft 910 and a head 950. The stake 148 is formed from a cylindrical pin, preferably about 1.2 inches in length and about 0.094 inches in diameter. The head-end of the pin defines about a 45-degree angle with one edge 915 of the cylinder defined by the diameter of the pin, which edge is therefore the longest portion of the pin. A head is formed into the head-end of the pin by grinding a flute 920 into it. The flute 920 is preferably ground using a grinding wheel such as the one illustrated in FIG. 10, indicated generally at 990. The grinding wheel 990 preferably has about a 3 inch radius, and has two grinding faces 991 defining about a 90-degree angle between them and about a 45-degree angle between each grinding face and the plane 995 defined by the circumference of the grinding wheel. The flute 920 preferably has bilateral symmetry about a plane defined by the axis of radial symmetry of the shaft 148 and the longest portion of the shaft. This bilateral symmetry is useful because it ensures the consistent performance of the stake 148 in terms of controlling the rate of gas released when the membrane is punctured. The flute 920 preferably begins about 0.15 inches from the tip 917 of the head-end of the stake 148 along the axis of radial symmetry, and about 0.15 inches closer to the axis of radial symmetry than the longest portion of the pin. The shaft 910 is preferably about 0.9 inches in length, and consists of the portion of the stake 148 between the foot-end 919 of the pin and the end of the flute 920 closest to it. The head 950 makes up the remainder of the length of the stake 148, and consists of the portion between the tip 917 of the head-end of the pin and the end of the flute furthest from it.

When the stake 148 strikes the membrane, the flute 920 causes the head 950 of the stake 148 to cut a "C"-shaped flap into the membrane, which is then bent inwardly as the stake 148 continues to move. The flute 920 further prevents the stake 148 from sealing the hole, so that gas is permitted to escape at a controlled rate. The length of the flute is important, since, if it is too long, gas will be permitted to escape past the internal passageway 142, preventing the balloon from fully inflating. The length of the flute is controlled by the radius of the grinding wheel used to grind it into the pin. Thus, the three inch radius is desirable for producing the proper release of gas.

The angle that the head-end of the pin defines relative to the axis of the shaft controls the rate of gas release. If the angle is less than 45 degrees, gas will be released more rapidly. However, in practice it has been determined that too-rapid inflation, even at a given pressure, can cause the balloon to rupture. This is true even of Mylar balloons, which exert essentially no pressure and do not deform until the balloon is nearly completely inflated. If the angle defined by the head-end of the pin and the axis of the shaft is greater than 45 degrees, the rate of gas release will be slowed. Too slow a rate of inflation diminishes the surprise and visual impact of the automatic balloon inflation, and is therefore undesirable. In practice, a roughly 45-degree angle has been found to strike the optimal balance between protecting the balloon from damage and providing a strong visual impact. Stakes made from pins having such a 45-degree angle will typically cause an 18" balloon to be inflated in about 15 seconds.

Another benefit to the higher rate of gas release and the cutting of the "C"-shaped flap is that the bent "C"-shaped flap interacts with the rapidly moving gas to produce a distinctive noise. The noise further enhances the surprise and sensory impact of the automatically inflating balloon.

While the invention has been illustrated and described in detail in the drawings and foregoing description, the same is to be considered as illustrative and not restrictive in character, it being understood that only the preferred embodiment, and certain alternative embodiments deemed helpful in further illuminating the preferred embodiment, have been shown and described and that all changes and modifications that come within the spirit of the invention are desired to be protected.

What is claimed is:

1. A valve for a self-triggering inflatable balloon device, comprising:
    a valve casing having an exterior, an interior, and an aperture for coupling a compressed gas container thereto and a nipple for coupling a balloon thereto;
    a spike contained within the valve casing, the spike comprising:
        a head portion adapted to strike a membrane of said gas container and cut a hole into the membrane;
        a shaft portion disposed adjacent the head portion;
        a flute formed into the head portion and adapted to prevent the spike from sealing said hole, the flute being formed by grinding with a grinding wheel; and
    biasing means disposed between the spike and an interior surface of the valve casing, wherein the biasing means urges the spike toward the aperture; and
    a trigger extending from the exterior to the interior of the valve casing, wherein the trigger limits movement of the spike toward the aperture;
    wherein removal of the trigger from the valve casing enables the biasing means to propel the spike into the aperture, thereby allowing compressed gas within the container to escape into an interior of the balloon, thereby inflating the balloon.

2. The valve of claim 1, wherein said flute has bilateral symmetry about a plane including an axis of radial symmetry of said shaft portion.

3. The valve of claim 1, wherein said flute is formed by grinding said flute into a pin with a grinding wheel.

4. The valve of claim 3, wherein said pin has a diameter of about 0.094 inches and a length of about 1.2 inches.

5. The valve of claim 4, wherein said grinding wheel is about 3 inches in diameter and has two grinding faces each defining about a 45-degree angle with a plane defined by a circumference of said grinding wheel.

6. The valve of claim 3, wherein said grinding wheel is about 3 inches in diameter and has two grinding faces each defining about a 45-degree angle with a plane defined by a circumference of said grinding wheel.

7. The valve of claim 1, wherein said pin has a head-end defining about a 45-degree angle with an axis of said pin.

8. A valve for a self-triggering inflatable balloon device, comprising:
    a valve casing having an exterior, an interior, and an aperture for coupling a compressed gas container thereto and a nipple for coupling a balloon thereto;
    a spike contained within the valve casing, the spike comprising:
        a head portion adapted to strike a membrane of said gas container and cut a hole into the membrane;
        a shaft portion disposed adjacent the head position;
        a flute formed into the head portion and adapted to prevent the spike from sealing said hole;
        said flute being formed by grinding into a pin;
            said pin having a length of about 1.2 inches, a diameter of about 0.094 inches, and a head-end defining about a 45-degree angle with an axis of said pin;
            said grinding wheel having a diameter of about 3 inches and having two grinding surfaces each defining about a 45-degree angle with a plane defined by a circumference of the grinding wheel,
        said flute having bilateral symmetry about a plane including an axis of radial symmetry of said shaft portion; and
    biasing means disposed between the spike and an interior surface of the valve casing, wherein the biasing means urges the spike toward the aperture; and
    a trigger extending from the exterior to the interior of the valve casing, wherein the trigger limits movement of the spike toward the aperture;
    wherein removal of the trigger from the valve casing enables the biasing means to propel the spike into the aperture, thereby allowing compressed gas within the container to escape into an interior of the balloon, thereby inflating the balloon.

* * * * *